INVENTOR:
EUGENE D. COWLIN
BY Saywell and Wesseler
ATTORNEYS.

Patented July 12, 1932

1,867,251

UNITED STATES PATENT OFFICE

EUGENE D. COWLIN, OF MASSILLON, OHIO, ASSIGNOR TO THE RELIANCE MANUFACTURING COMPANY, OF MASSILLON, OHIO, A CORPORATION OF OHIO

SPRING WASHER

Application filed May 28, 1931. Serial No. 540,576.

The invention particularly relates to spring washers consisting of a ring having a radial cut forming end portions which are bent from the plane of the ring in opposite directions so as to adapt them to engage adjacently upper and lower members, such lower member being preferably a wood body or other comparatively soft substance and the upper member being usually a nut. These engaging washer ends are bent upon substantially parallel lines running transversely of the washer stock. More particularly, the invention relates to a spring washer of this type which is of uniform cross-section throughout, preferably of rectangular cross-section. Such a construction insures a wood-engaging terminal portion which is blunt, and this wood-engaging end is so bent that it extends in a direction approximately perpendicular to the faces of the body of the washer so that the blunt terminal of the down-turned portion engages the wood. The up-turned end is bent to a comparatively slight extent, although in fact rather sharply upturned, so that the upper face of the upturned end engages the lower face of the adjacent nut, and the terminal of the upturned end is adapted to bite into the nut material, if the nut tends to back off the bolt. Preferably the ring segment is of helical formation.

The invention should be particularly distinguished from those constructions in which the washer stock, including the work-engaging ends, is of non-uniform cross-section, or in which the oppositely turned ends are not bent upon substantially parallel lines, or upon lines, transversely of the segment body, or in which the nut-engaging end is primarily a side-lock for the nut and not a nut-face engaging member, or in which the wood-engaging terminal is pointed or sharp.

The annexed drawing and the following description set forth in detail certain means embodying my invention, such means constituting, however, but one of the various mechanical forms in which the principle of the invention may be illustrated.

Figures 1, 2, 3, 4, 5, 6, 7:
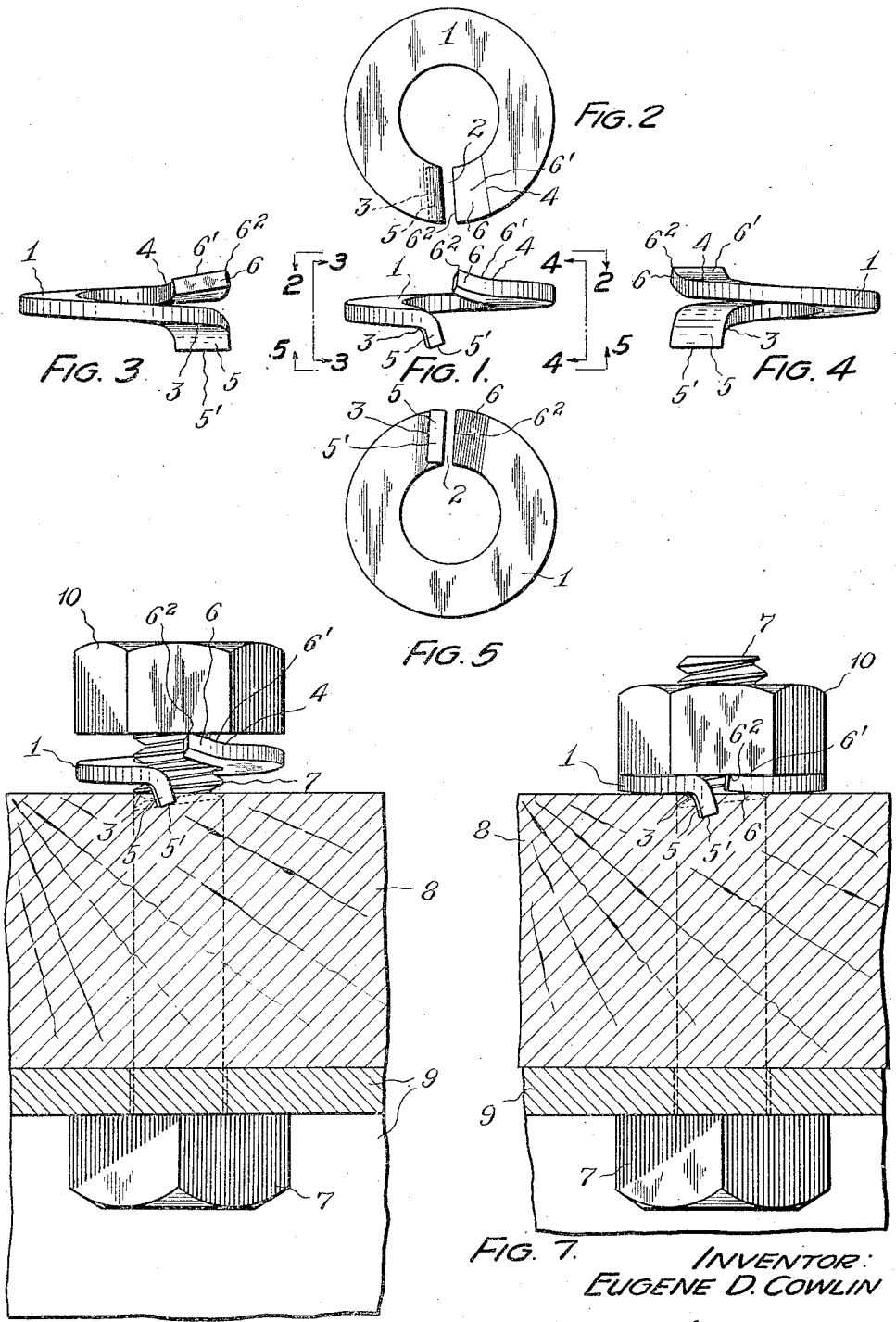
Figure 1 is a front elevation of my improved spring washer.
Figure 2 is a top plan thereof.
Figures 3 and 4 are respectively opposite side elevations.

Figure 5 is a bottom plan, the plane from which the different views, Figures 2, 3, 4, and 5, are taken being indicated upon Figure 1 by the respective lines 2—2, 3—3, 4—4, and 5—5;

Figure 6 is a broken section of two members adapted to be connected by a bolt and co-operating nut, which also are shown, and with which my improved spring washer is adapted to co-operate, the view showing the positions of the several parts after the nut has been only slightly tightened; and Figure 7 is a view of the elements shown in Figure 6 after the nut has been wholly tightened.

Referring to the annexed drawing in which the same parts are indicated by the same respective numbers in the several views, a ring washer segment has a main body portion 1 and two end portions 5 and 6 formed by cutting the segment in a radial line 2. The segment is preferably of helical formation and the cross-sectional shape of the stock is preferably rectangular. The end members 5 and 6 are respectively down-turned and up-turned upon bend lines 3 and 4, respectively, which are substantially parallel and extend transversely of the washer stock. These bend lines 3 and 4 are also substantially parallel with the radial cut line 2. The ends 5 and 6 are not bent laterally of the body 1 to any appreciable extent but substantially entirely lie within the vertical planes bounding the body 1. In bending and forming the oppositely-directed ends 5 and 6, they are not changed in cross-sectional shape and size. These ends 5 and 6 are not bent to the same extent but the end 5 is bent downwardly to an extent approximating a right angle with the work-engaging faces of the body 1, and the end 6 is bent upwardly only to a comparatively slight extent, although markedly upturned. The sharply bent down-turned end 5 is designed to engage a wood surface by its extreme end portion 5', and the upper face 6' of the up-turned end 6 is designed to engage the lower face of a nut. Furthermore, the upper terminal edge 6² of the up-turned end 6 is designed to cut into the nut, upon any tendency of the latter to back off the bolt, so as to prevent such loosening of the nut.

In Figures 6 and 7, I have illustrated the application of my improved washer when a wood member 8 or other comparatively penetrative member is joined to a second member 9 by a bolt 7 and a nut 10. In Figure 6 the helical spring washer is shown engaging the bottom face of the nut 10 by its up-turned end 6 and slightly penetrating the underlying face of the wood surface 8 with its down-turned end 5, the nut 10 being shown only slightly tightened in this view. In Figure 7, wherein the nut 10 is entirely tightened down, it will be noted that the down-turned end 5 has been pressed into the wood surface 8 to its full extent, that the body 1 and the up-turned end 6 have been straightened into substantially a plane body with the terminal portion 6² of the up-turned end 6 slightly spaced from the wood-surface 8 whereby this terminal portion 6² is adapted to cut into the under face of the nut 10 upon any tendency of the latter to back off of the bolt 7.

The described washer improvements present a construction which is economically manufactured and particularly lends itself to quantity production, the wire being first coiled, and then the washer cut off and both ends bent in one operation with the same tool. The described washer construction, because of the blunt formation of the wood-penetrating end, does not unduly readily penetrate the wood but throws the reactive force back into the washer body to be exerted against the face of the nut. The construction also, because of the nature of the formation of the up-turned end, permits the efficient and convenient application and tightening of the nut and securely engages and holds the face of the nut thus efficiently preventing the loosening and backing off of the same.

What I claim is:

1. A spring washer comprising a split ring segment of uniform cross-sectional shape and size throughout, said segment having a body portion, a wood-engaging end bent from said body portion to an approximately ninety-degree angle, and a nut-engaging end bent from said body portion at an angle materially less than ninety degrees.

2. A spring washer comprising a split ring segment of uniform cross-sectional shape and size throughout, said segment having a helical body portion, a wood-engaging end bent from said body portion to an approximately ninety-degree angle, and a nut-engaging end bent from said body portion at an angle materially less than ninety degrees.

3. A spring washer comprising a split ring segment of substantially uniform rectangular cross-section throughout, said segment having a body portion, an up-turned nut-engaging end and a down-turned wood-penetrating end, said ends being formed by bending the stock upon lines substantially parallel with the split of the segment, said down-turned end being bent to an approximately ninety-degree angle and terminating in a blunt terminal portion, and said up-turned end being bent at an angle materially less than ninety-degrees whereby it presents an edge to the face of the nut which it is adapted to engage.

4. A spring washer comprising a split ring segment of substantially uniform rectangular cross-section throughout, said segment having a helical body portion, an upper up-turned nut-engaging end and a lower down-turned wood-engaging end, said ends being formed by bending the stock upon lines substantially parallel with the split of the segment, said down-turned end being bent to an approximately ninety-degree angle and terminating in a blunt terminal portion, and said up-turned end being bent at an angle materially less than ninety degrees whereby it presents an edge to the face of the nut which it is adapted to engage.

5. A spring lock washer comprising a substantially annular member formed with a radial cut, said member having ends of substantially uniform rectangular cross-section, said ends being bent about lines substantially parallel to said cut, one of said ends being bent downwardly to an approximately ninety-degree angle and having its terminal portion blunt, and the other of said ends being bent upwardly materially less than ninety degrees and presenting an edge adapted to prevent the backing off of a nut.

6. A spring lock washer comprising a split ring member of uniform cross-section throughout, said member having its ends bent about lines substantially parallel to the split thereof, one of said ends being bent downwardly to an approximately ninety-degree angle, the other of said ends being bent upwardly at an angle materially less than ninety degrees, and the terminal portion of each end being unchanged in cross-section by the bending whereby the downwardly bent end presents a blunt terminal to the surface it engages and the upwardly bent end presents an edge adapted to bite into the surface it engages.

7. The spring lock washer set forth in claim 6 characterized by said member being of helical formation between the bent ends thereof.

8. The spring lock washer set forth in claim 5 characterized by said member being of helical formation between the bent ends thereof.

Signed by me this 25th day of May, 1931.

EUGENE D. COWLIN.